No. 894,866. PATENTED AUG. 4, 1908.
G. M. WHEELER & H. WILHELM.
DRY BATTERY.
APPLICATION FILED OCT. 12, 1907.

Witnesses
M. Levy.
H. D. Penney

Inventors
Henry Wilhelm
George M. Wheeler
By their Attorney, F. H. Richards.

UNITED STATES PATENT OFFICE.

GEORGE M. WHEELER AND HENRY WILHELM, OF BROOKLYN, NEW YORK.

DRY BATTERY.

No. 894,866.   Specification of Letters Patent.   Patented Aug. 4, 1908.

Application filed October 12, 1907. Serial No. 397,089.

*To all whom it may concern:*

Be it known that we, GEORGE M. WHEELER, a citizen of the United States, residing at Brooklyn, in the county of Kings and State of New York, and HENRY WILHELM, a citizen of the United States, residing at Brooklyn, in the county of Kings and State of New York, have invented certain new and useful Improvements in Dry Batteries, of which the following is a specification.

The present improvement relates to dry batteries, the object of the invention being to provide an improved dry battery in which the use of a zinc cup is dispensed with, whereby a great saving in the cost of producing these batteries is obtained, while providing a better battery than those heretofore produced by using such a cup.

In the manufacture of dry batteries as now commercially practiced, it has been found necessary to provide a zinc cup within which to place the filling material or powder, the zinc cup being deemed necessary, for one reason, because in order to properly manufacture the battery the powder had to be rammed into a compact mass, and this required, as was thought, the use of a zinc cup to enable this to be done. This cup, of course, was made up with a bottom, which either had to be soldered to the cylinder forming the cup or else the cup had to be drawn out, an expensive procedure in either event, as the cup had to be of considerable thickness, so that the cost of the material alone was considerable. Not only this, but if the cup was made by soldering the longitudinal or side seam of the cylinder, instead of drawing the cup out, the bottom also had to be soldered thereto, this being usually a preferable mode heretofore adopted of making the cups. The cost of stamping the bottoms and of the labor in soldering the cylinder and the bottom thereto, together with the cost of the soldering irons, solder and the gas necessarily used for this purpose, together with the amount of zinc which had to be used has made the cost of dry batteries amount to about $50. to $60. per thousand, exclusive of the filling material and the operation of filling. In the present battery, however, we are able to dispense with all this soldering, and therefore with the soldering material, and are able to use a much thinner piece of zinc to coact with the filling, we have found by actual practice that we can produce these dry batteries at about $15. per thousand, which is a saving of $35. to $45. per thousand. The old zinc cups alone cost about $35. a thousand.

Figure 1:
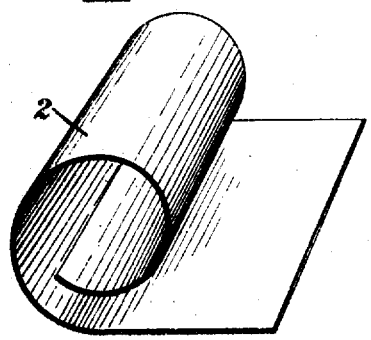
Figure 2:
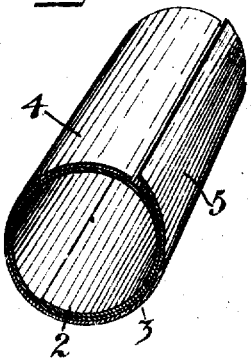
Figure 3:
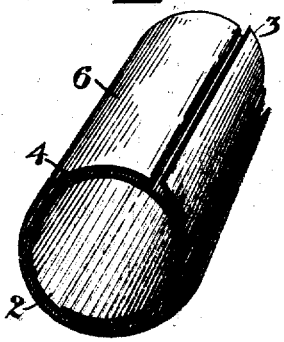
Figure 4:
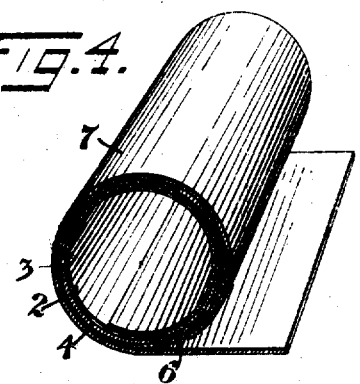
Figure 5:
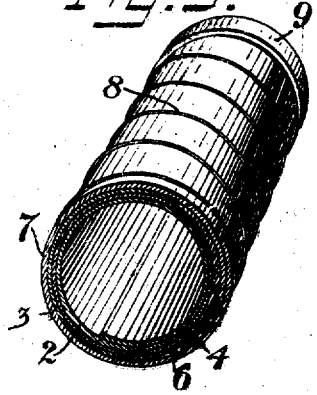
Figure 6:
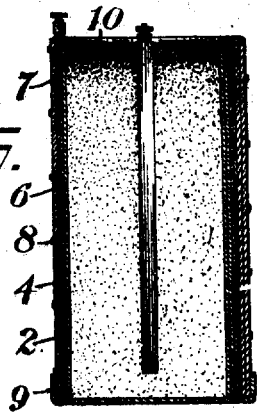
Figure 7:
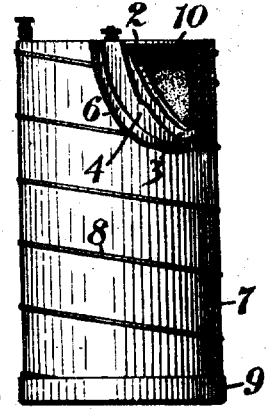
Figure 8:
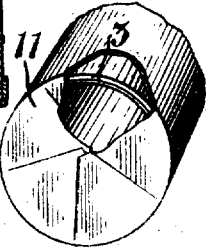

In the drawings accompanying and forming part of this specification, Figure 1 illustrates a perspective view of a sheet of porous separating material, such for instance as blotting paper, partially folded; Fig. 2 illustrates a perspective view of this material inclosed within a sheet of zinc; Fig. 3 is a perspective view of the blotting paper and zinc shown in Fig. 2, with a sheet of insulating material, such as paraffin paper, folded around and inclosing the zinc; Fig. 4 is a perspective view of these several sheets inclosed within a sheet of wrapping paper to form a suitable carton; Fig. 5 is a perspective view of the structure shown in Fig. 4 with a reinforcing means applied around the same in the form of a wire, and a bottom applied thereto in the form of a pasteboard cap; Fig. 6 is a vertical sectional view of the structure shown in Fig. 5; Fig. 7 is a side view, partly broken away, of the structure shown in Fig. 5; Fig. 8 is a view of the blotting paper and zinc sheet, the latter inclosing the former, with the insulating material or paraffin paper inclosing the zinc, but folded at one end of the structure to form a bottom of insulating material, this paraffin paper being broken away to show the blotting paper and the zinc, the longitudinal edges of which are shown as meeting in this instance.

In carrying out the present improvement, we first take a suitable material, such for instance as a porous separating material, for instance a piece of blotting paper, and wrap it into the form of a tube 2 and insert this into a sheet of zinc previously wrapped to form a complete tube 3, as shown in Fig. 8; or only a partial tube 4, as shown in Figs. 2 to 5; or a sheet of zinc of sufficient thinness may be wrapped around the blotting paper, or the two may be wrapped together, it not being necessary in the present improvement that the zinc entirely inclose the blotting paper. For instance, in Fig. 2, the zinc is shown extending only partially around the blotting paper, a considerable space 5 being left between the longitudinal edges of the zinc. These two members are then inclosed in a sheet of insulating material 6, which may be wrapped around the same, or therewith, in the manner hereinbefore described, which insulating material is preferably of paraffin paper of sufficient size to cover the zinc, since it is not necessary to wrap it over the blotting paper. The structure or cell thus made may then be inserted in a carton, but is preferably inclosed within a suitable wrapper 7, which may be in the manner hereinbefore described wrapped around the cylinder so made up. All of the sheets making up the battery may, however, be wrapped together into the form of a tube.

For the purpose of stiffening or reinforcing the cylinder so made up, in order to permit the filling material or powder to be properly rammed, the wrapper, when folded in sheet form around the same, may be wound with some suitable reinforcing means 8, such for instance as an inexpensive wire, such as iron wire, or a suitable thickness of paper or carton may be used, which will alone be sufficiently stiff to permit the proper packing of the powder. The cylinder may then be filled by resting one end on a suitable platform or table, but preferably one end is provided with a closure 9, which may be in the form of a cap of pasteboard or other suitable material, or the end may be pitched to form a bottom for the cylinder. The filling and the carbon are then inserted, the former being properly rammed. The top is then pitched in the usual manner as at 10, see Fig. 6.

In some forms the edges of the zinc may meet, as in Fig. 8, and the outer insulating material or paraffin paper may be folded around one end, as at 11, Fig. 8, before the outer wrapper is placed on the cylinder.

If desired, and when the cylinder wrapper is reinforced by iron wire, a further wrapper may be pasted around the outside, and on this the usual printing may be placed. This wrapper will prevent rust of the wire.

By the present improvement we are able to entirely dispense with the ordinary zinc cup, and simply use a comparatively thin sheet of zinc, which may extend only partially around the cylinder, and by inclosing this sheet of zinc in a suitable insulating material, such as paraffin paper, we are able to prolong the life of the battery, since, in the present improvement, the battery will not become useless as soon as the zinc becomes porous as in the ordinary form of battery, but will be capable of properly performing its function owing to the use of the outer insulating material until nearly all of the zinc has been used up. Furthermore, a better battery is produced, because if the zinc should have a small pin hole in it the battery will still have life as long as the binding post holds to the zinc. Moreover, as hereinbefore stated, we are able, by dispensing with the zinc cup, to very materially reduce the cost of producing these batteries, which is at the present time a material factor in the manufacture of batteries.

We claim as our invention:

1. A dry battery cell of a size to receive the filling mixture and made up of a plurality of tubularly folded sheets, one a zinc sheet, and a closure for such cupless tube.

2. A dry battery cell of a size to receive the filling mixture and made up of a plurality of tubularly folded sheets, one a porous sheet, one a zinc sheet and one an insulating sheet, and a closure for such cupless tube.

3. A dry battery cell of a size to receive the filling mixture and made up of a plurality of tubularly folded sheets, one a porous sheet, one a zinc sheet, one an insulating sheet, and one a wrapping sheet, and means for closing the end of such cupless tube.

4. A dry battery cell of a size to receive the filling mixture and made up of a plurality of sheets each of a different material, rolled into a tube, and a closure for such tube.

5. A dry battery cell of a size to receive the filling mixture and made up of a plurality of sheets, one a zinc sheet, rolled into a tube, and one of said sheets folded to close the end of said tube.

6. A dry battery cell of a size to receive the filling mixture and made up of three sheets, each of a different material, one a zinc sheet, rolled into a tube, and a closure for said tube.

7. A dry battery cell of a size to receive the filling mixture and made up of a plurality of sheets comprising a porous sheet, a zinc sheet and an insulating sheet, rolled into a tube, and a closure for said tube.

8. A dry battery cell of a size to receive the filling mixture and made up of a plurality of sheets comprising a porous sheet, a zinc sheet, an insulating sheet and a wrapper sheet, rolled into a tube, and a closure for said tube.

9. A dry battery cell of a size to receive the filling mixture and made up of a plurality of sheets comprising a porous sheet, a zinc sheet, an insulating sheet, and a wrapper sheet, rolled into a tube, one of said sheets folded to close the end of said tube.

10. A dry battery cell of a size to receive the filling mixture and made up of a plurality of sheets comprising a porous sheet, a zinc sheet, an insulating sheet, and a wrapper sheet, rolled into a tube, a plurality of said sheets folded to close the end of said tube.

11. A dry battery cell of a size to receive the filling mixture and made up of a plurality of sheets comprising a sheet of blotting paper, a zinc sheet, a paraffin sheet, and a stiffened wrapper sheet, rolled into a tube, some of said sheets folded to close the end of said tube.

12. A dry battery cell of a size to receive the filling mixture and made up of a plurality of sheets, one a zinc sheet, rolled together into a tube, and one of said sheets folded to close the end of said tube.

GEORGE M. WHEELER.
HENRY WILHELM.

Witnesses:
CARRIE WILHELM,
MATILDA E. WHEELER